US00RE42908E

(19) United States
(12) Reissued Patent
Ito et al.

(10) Patent Number: US RE42,908 E
(45) Date of Reissued Patent: Nov. 15, 2011

(54) VAPOR-COMPRESSION-TYPE REFRIGERATING MACHINE

(75) Inventors: Shigeki Ito, Okazaki (JP); Teruyuki Hotta, Nagoya (JP); Yasushi Yamanaka, Nakashima-gun (JP)

(73) Assignee: Denso Corporation, Kariya (JP)

(21) Appl. No.: 11/284,394

(22) Filed: Nov. 21, 2005

Related U.S. Patent Documents

Reissue of:
(64) Patent No.: 6,935,128
Issued: Aug. 30, 2005
Appl. No.: 10/794,710
Filed: Mar. 5, 2004

(30) Foreign Application Priority Data

Mar. 5, 2003 (JP) ..... 2003-058507

(51) Int. Cl.
*F25B 41/04* (2006.01)
*F25B 41/00* (2006.01)

(52) U.S. Cl. ..... 62/222; 62/513; 236/92 B

(58) Field of Classification Search ..... 62/222, 62/224, 225, 513, 113; 236/92 B, 93 A
See application file for complete search history.

(56) References Cited

U.S. PATENT DOCUMENTS 3,695,577 A 10/1972 Jespersen
4,809,518 A 3/1989 Murayama
5,642,858 A 7/1997 Kakehashi et al.
5,732,570 A 3/1998 Tomatsu et al.
5,996,900 A * 12/1999 Ise ..... 236/92 B
6,334,324 B1 1/2002 Muta et al.
6,460,358 B1 * 10/2002 Hebert ..... 62/225
2002/0139133 A1 * 10/2002 Hwang ..... 62/210
2004/0112073 A1 6/2004 Ito et al.
2006/0150650 A1 * 7/2006 Murase et al. ..... 62/222
2006/0288732 A1 * 12/2006 Komatsu et al. ..... 62/498
(Continued)

FOREIGN PATENT DOCUMENTS

JP 49-12211 3/1974
(Continued)

OTHER PUBLICATIONS

Office Action dated May 22, 2007 in corresponding JP Application No. 2003-058507.

*Primary Examiner* — Marc E Norman
(74) *Attorney, Agent, or Firm* — Harness, Dickey & Pierce, PLC

(57) ABSTRACT

The internal heat exchanger 7 is provided which exchanges heat between the refrigerant of low pressure and the refrigerant of high pressure, and the pre-load adjusting mechanism of the expansion valve 5 is abolished. Due to the above structure, the refrigerant flowing into the expansion valve 5 is cooled in the internal heat exchanger 7, and enthalpy of the refrigerant flowing into the evaporator 6 is reduced. On the contrary, the refrigerant sucked into the compressor 1 is heated. Accordingly, a difference in enthalpy between the refrigerant at the inlet and the refrigerant at the outlet of the evaporator 6 can be made large, and the heat absorbing capacity of the evaporator 6 can be enhanced, and further it becomes possible to give the degree of superheat to the refrigerant sucked into the compressor 1. Therefore, even if the pre-load adjusting mechanism is abolished, the vapor-compression-type refrigerating machine can be stably operated.

29 Claims, 11 Drawing Sheets

U.S. PATENT DOCUMENTS

| | | | | |
|---|---|---|---|---|
| 2007/0074538 | A1* | 4/2007 | Kurata et al. | 62/513 |

FOREIGN PATENT DOCUMENTS

| | | |
|---|---|---|
| JP | 54-75647 | 6/1979 |
| JP | 55-133167 | 9/1980 |
| JP | 57-457 | 1/1982 |
| JP | 62-19650 | 1/1987 |
| JP | 63-80169 | 4/1988 |
| JP | 01-102254 | 4/1989 |
| JP | 7-19622 | 1/1995 |
| JP | 7-248160 | 9/1995 |
| JP | 8-320170 | 12/1996 |
| JP | 9-144943 | 6/1997 |
| JP | 2001-82835 | 3/2001 |
| JP | 2001-270323 | 10/2001 |
| JP | 2001-317832 | 11/2001 |
| JP | 2002-213842 | 7/2002 |

* cited by examiner

RELATION BETWEEN STATE OF REFRIGERANT AT OUTLET OF EVAPORATOR AND AIR CONDITIONING PERFORMANCE

VAPOR-COMPRESSION-TYPE REFRIGERATING MACHINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a vapor-compression-type refrigerating machine for moving heat from a portion on the low temperature side to a portion on the high temperature side. The vapor-compression-type refrigerating machine of the present invention is effectively applied to an air conditioner for vehicle use.

2. Description of the Related Art

As well known, the vapor-compression-type refrigerating machine operates as follows. A liquid phase refrigerant is decompressed by an expansion valve, and the refrigerant, the pressure of which has been reduced, is evaporated so as to absorb heat, and the thus evaporated refrigerant, the phase of which has become a gas phase, is adiabatically compressed by a compressor so that the temperature can be raised and the heat absorbed in the process of evaporation can be radiated.

It is conventional that the expansion valve is provided with a spring for giving a pre-load (initial load) to the valve body which adjusts the degree of throttle opening so that the degree of superheat of the refrigerant sucked into the compressor can be in a predetermined range. Concerning this technique, for example, refer to the official gazette of Japanese Unexamined Patent Publication No. 2002-213842.

In this connection, the expansion valve is composed of a plurality of parts such as a diaphragm, valve body and so forth. Usually, the maximum displacement of the valve body is not more than 1 mm, that is, the maximum displacement of the valve body is very small. Accordingly, even if the dimensional fluctuation of parts composing the expansion valve is small, operation of the valve body can be greatly affected.

Therefore, it is conventional to provide a pre-load adjusting mechanism for adjusting a pre-load (initial load) given to the valve body or diaphragm by a spring. When the pre-load adjusting mechanism is adjusted after all parts have been assembled, the pre-load is adjusted so that the valve body can be appropriately operated.

According to the expansion valve described in the official gazette of Japanese Unexamined Patent Publication No. 2002-213842, the pre-load adjusting mechanism is provided. It is necessary to adjust the pre-load adjusting mechanism after all parts have been assembled. Therefore, it is difficult to decrease the number of parts of the expansion valve. Further, it is difficult to reduce the number of processes in the manufacturing process.

SUMMARY OF THE INVENTION

The present invention was accomplished in view of the above points. It is a first object of the present invention to provide a vapor-compression-type refrigerating machine including a new expansion valve different from the conventional one. It is a second object of the present invention to reduce the manufacturing cost of the vapor-compression-type refrigerating machine by reducing the manufacturing cost of the expansion valve.

In order to accomplish the above objects, according to an aspect of the present invention, a vapor-compression-type refrigerating machine for moving heat from a low temperature side to a high temperature side, comprises: a compressor (1) for sucking and compressing refrigerant; a radiator (2) for radiating heat from the refrigerant of high pressure; an expansion valve (5) for decompressing and expanding the refrigerant cooled by the radiator (2); an evaporator (6) for evaporating the refrigerant decompressed by the expansion valve (5) so that heat can be absorbed by the refrigerant; and an internal heat exchanger (7) for exchanging heat between the refrigerant of high pressure before the decompression by the expansion valve (5) and the refrigerant of low pressure to be sucked by the compressor (1), the expansion valve (5) including: a thin film-lice diaphragm (5c) forming an air-tightly closed space (5a) into which a predetermined mass of gas is enclosed; a valve body (5d) for changing a degree of throttle opening being interlocked with a displacement of the diaphragm (5c); a spring (5q) for giving an elastic force to the valve body (5d) in a direction so that a volume of the airtightly closed space (5a) can be reduced, from an opposite side of the diaphragm (5c) to the side of the diaphragm (5c) on which the airtightly closed space (5a) is located; and a load giving portion (5r) for giving an initial load to the spring (5q), wherein pressure in the airtightly closed space (5a) changes according to the temperature of the refrigerant flowing out from the evaporator (6), pressure of the refrigerant flowing out from the evaporator (6) acts on an opposite side of the diaphragm (5c) to the side of the diaphragm (5c) on which the airtightly closed space (5a) is located, and the load giving portion (5r) can not be moved with respect to the housing (5j).

According to the present invention, the internal heat exchanger (7) is provided. Therefore, the refrigerant flowing into the expansion valve (5) is cooled by this internal heat exchanger (7), and the enthalpy of the refrigerant flowing into the evaporator (6) is reduced. On the contrary, the refrigerant sucked into the compressor (1) is heated by this internal heat exchanger (7). Accordingly, a difference of enthalpy between the refrigerant at the inlet and the refrigerant at the outlet of the evaporator (6) is increased, and the heat absorbing capacity of the evaporator (6) can be enhanced. Further, as the degree of superheat of the refrigerant sucked into the compressor (1) can be enhanced, even if the pre-load adjusting mechanism is abolished, the vapor compression type refrigerating machine can be stably operated.

Accordingly, as the manufacturing cost of the expansion valve (5) can be reduced, the manufacturing cost of the vapor compression type refrigerating machine can be decreased.

According to another aspect of the present invention, a vapor-compression-type refrigerating machine for moving heat from a portion on the low temperature side to a portion on the high temperature side, comprises: a compressor (1) for sucking and compressing refrigerant; a radiator (2) for radiating heat from the refrigerant of high pressure; an expansion valve (5) for decompressing and expanding the refrigerant cooled by the radiator (2); an evaporator (6) for evaporating the refrigerant decompressed by the expansion valve (5) so that heat can be absorbed by the refrigerant; and an internal heat exchanger (7) for exchanging heat between the refrigerant of high pressure before the decompression by the expansion valve (5) and the refrigerant of low pressure to be sucked by the compressor (1), the expansion valve (5) including: a thin film-like diaphragm (5c) forming an air-tightly closed space (5a) into which a predetermined mass of gas is enclosed; and a valve body (5d) for changing a degree of throttle opening being interlocked with a displacement of the diaphragm (5c), wherein pressure in the airtightly closed space (5a) changes according to the temperature of the refrigerant flowing out from the evaporator (6), pressure of the refrigerant flowing out from the evaporator (6) acts on an opposite side of the diaphragm (5c) to the side of the diaphragm (5c) on which the airtightly closed space (5a) is located, and the diaphragm (5c) is displaced only by a difference in pressure between the airtightly closed space (5a) and the refrigerant flowing out from the evaporator (6).

As the internal heat exchanger (7) is provided in the present invention, the refrigerant flowing into the expansion valve (5) is cooled by this internal heat exchanger (7). Therefore, enthalpy of the refrigerant flowing into the evaporator (6) is reduced. On the contrary, the refrigerant sucked into the compressor (1) is heated.

Accordingly, a difference of enthalpy between the refrigerant at the inlet and the refrigerant at the outlet of the evaporator (6) is increased, and the heat absorbing property of the evaporator (6) can be enhanced. Further, as the degree of superheat of the refrigerant sucked into the compressor (1) can be enhanced, even if the pre-load adjusting mechanism is abolished, the vapor compression type refrigerating machine can be stably operated.

Accordingly, as the manufacturing cost of the expansion valve (5) is reduced, the manufacturing cost of the vapor-compression-type refrigerating machine can be decreased.

According to the present invention, the connecting rod (5f) for connecting the diaphragm (5c) with the valve body (5d) is joined to the diaphragm (5c), and further the connecting rod (5f) is joined to the valve body (5d).

Due to the above structure, the diaphragm (5c) and the valve body (5d) can be integrally displaced. Therefore, the expansion valve (5) can respond quickly.

In the present invention, the diaphragm case (5s) for supporting the diaphragm (5c) from an opposite side of the diaphragm (5c) to the side of the diaphragm (5c), on which the airtightly closed space (5a) is located, is formed being integrated with the housing (5j) in which the valve seat (5h) is formed. Alternatively, the diaphragm case (5s) is integrally joined to the housing (5j).

Due to the above structure, the dimensional accuracy of assembling the diaphragm (5c), valve body (5d) and valve seat (5h) can be enhanced.

According to the present invention, the internal heat exchanger (7) is a double tube composed of an inner cylindrical tube (7a) and outer cylindrical tube (7b).

According to the present invention, the expansion valve (5) is accommodated in the piping means which composes a refrigerant passage in which the refrigerant of low pressure is flowing.

Due to the above structure, for example, while the expansion valve (5) is being protected from heat generated by the running engine, noise generated by the vibration of the expansion valve (5) can be reduced. Further, while a malfunction of the expansion valve (5) caused by heat generated by the engine is being prevented, the degree of freedom can be extended when a position, at which the expansion valve (5) is mounted, is to be determined.

According to the present invention, the expansion valve (5) is fixed in such a manner that the expansion valve (5) can be elastically displaced in the piping means (8).

Due to the above structure, vibration of the expansion valve (5) generated in the process of decompression can be absorbed. Therefore, noise caused by the vibration of the expansion valve (5) can be reduced.

According to the present invention, the internal heat exchanger (7) and the expansion valve (5) are integrated with each other into one body.

Due to the above structure, the number of pipes can be reduced. Therefore, the number of processes for assembling the vapor compression type refrigerating machine can be decreased, and the vapor-compression-type refrigerating machine can be installed in a small space.

The present invention may be more fully understood from the description of preferred embodiments of the invention, as set forth below, together with the accompanying drawings.

DESCRIPTION OF THE PREFERRED EMBODIMENTS (First Embodiment)

Figure 1:
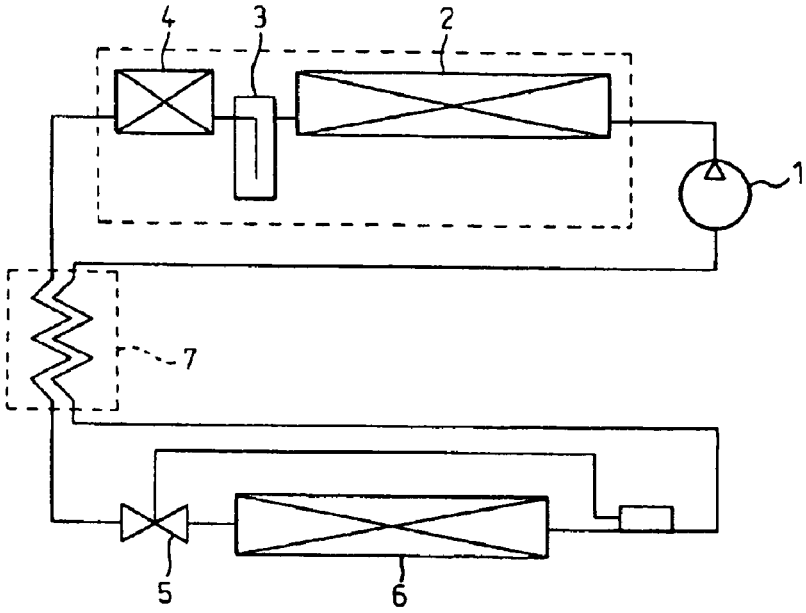
FIG. 1 is a view showing a model of a vapor-compression-type refrigerating machine of a first embodiment of the present invention.
Figure 2:
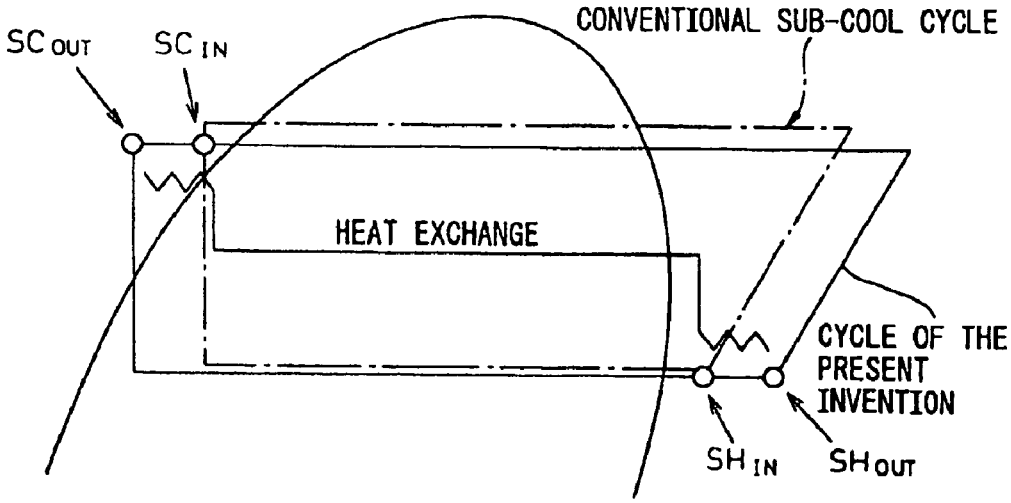
FIG. 2 is a p-h diagram of the vapor-compression-type refrigerating machine of the first embodiment of the present invention.
Figure 3:
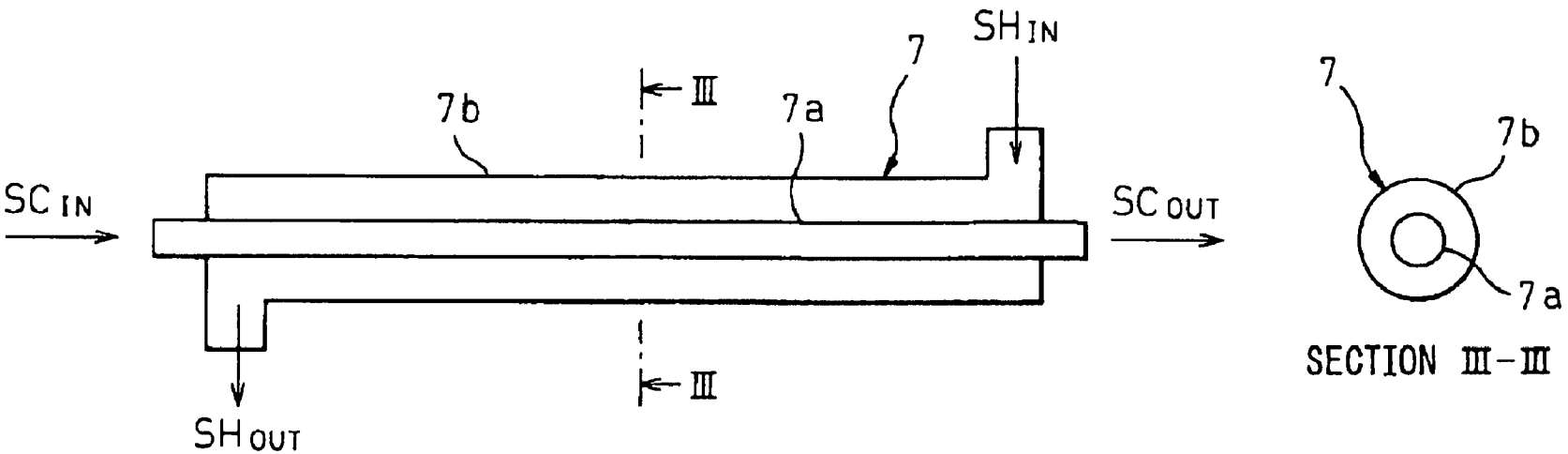
FIG. 3 is a schematic illustration of the internal heat exchanger of the first embodiment of the present invention.

In this embodiment, the vapor-compression-type refrigerating machine of the present invention is applied to an air-conditioner for vehicle use. FIG. 1 is a view showing a model of the vapor-compression-type refrigerating machine of the present invention, and FIG. 2 is a p-h diagram of the vapor compression type refrigerating machine of the present invention.

In FIG. 1, the compressor 1 sucks and compresses the refrigerant. In this embodiment, the compressor 1 is assembled to an engine for running and driven by the power supplied from the engine. The radiator 2 is a heat exchanger on the high pressure side which exchanges heat between the refrigerant of high pressure, which has been discharged from the compressor 1, and the outside air so that the refrigerant of high pressure can be cooled.

In this connection, in this embodiment, the pressure of the refrigerant of high pressure is set at a value lower than the critical pressure of the refrigerant. Therefore, while the refrigerant is changing from the vapor phase to the liquid phase in the radiator 2, the enthalpy of the refrigerant is decreased.

The receiver 3 is a vapor-liquid separator for separating the refrigerant flowing out from the radiator 2 into a vapor-phase refrigerant and a liquid-phase refrigerant and for storing the redundant refrigerant as the liquid-phase refrigerant. The supercooler 4 is a sub-cooler for further cooling the liquid phase refrigerant, which is supplied from the receiver 3, so as to enhance the degree of supercooling of the refrigerant.

In this connection, in the present embodiment, the radiator 2 which functions as a condenser, receiver 3 and supercooler 4, are integrated with each other into one body by means of brazing.

The expansion valve 5 is a decompressing means for decompressing the refrigerant at high pressure. In this embodiment, the temperature type expansion valve is employed in which the variable throttling portion for adjusting the degree of throttling according to the degree of superheat on the delivery side of the evaporator 6 and the temperature detecting portion for detecting the degree of superheat of the refrigerant are integrated into one body. The detailed explanations of the structure will be made later.

The evaporator 6 is a low temperature side heat exchanger for evaporating the liquid phase refrigerant which has been decompressed by the expansion valve 5. In this embodiment, the evaporator 6 operates in such a manner that heat is absorbed from a current of air blowing out into the passenger's compartment and the refrigerant is evaporated so that the current of air blowing out into the passenger's compartment can be cooled and the thus absorbed heat is radiated outside by the radiator 2. On the contrary, heat may be absorbed from the outside air and the thus absorbed heat may be radiated into the current of air blowing out into the passenger's compartment so that the passenger's compartment can be heated.

In the internal heat exchanger 7, heat is exchanged between the refrigerant at high pressure, before the decompression conducted by the expansion valve 5, and the refrigerant of low pressure, to be sucked into the compressor 1. By this internal heat exchanger 7, the refrigerant flowing into the expansion valve 5 is cooled, and the enthalpy of the refrigerant flowing into the evaporator 6 is decreased. On the contrary, the refrigerant sucked into the compressor 1 is heated, and the degree of superheat can be increased.

In this connection, the internal heat exchanger 7 is a double tube type heat exchanger composed of an inner cylindrical tube 7a, in which the refrigerant of high pressure flows, and an outer cylindrical tube 7b in which the refrigerant of low pressure flows. In this connection, in this embodiment, both the inner cylindrical tube 7a and the outer cylindrical tube 7b are formed into a cylinder. However, it should be noted that the present invention is not limited to the above specific embodiment and, for example, both the inner cylindrical tube 7a and the outer cylindrical tube 7b may be formed into a square tube.

Next, referring to FIGS. 4 and 5, the structure of the expansion valve 5 will be described below.

Figure 4:
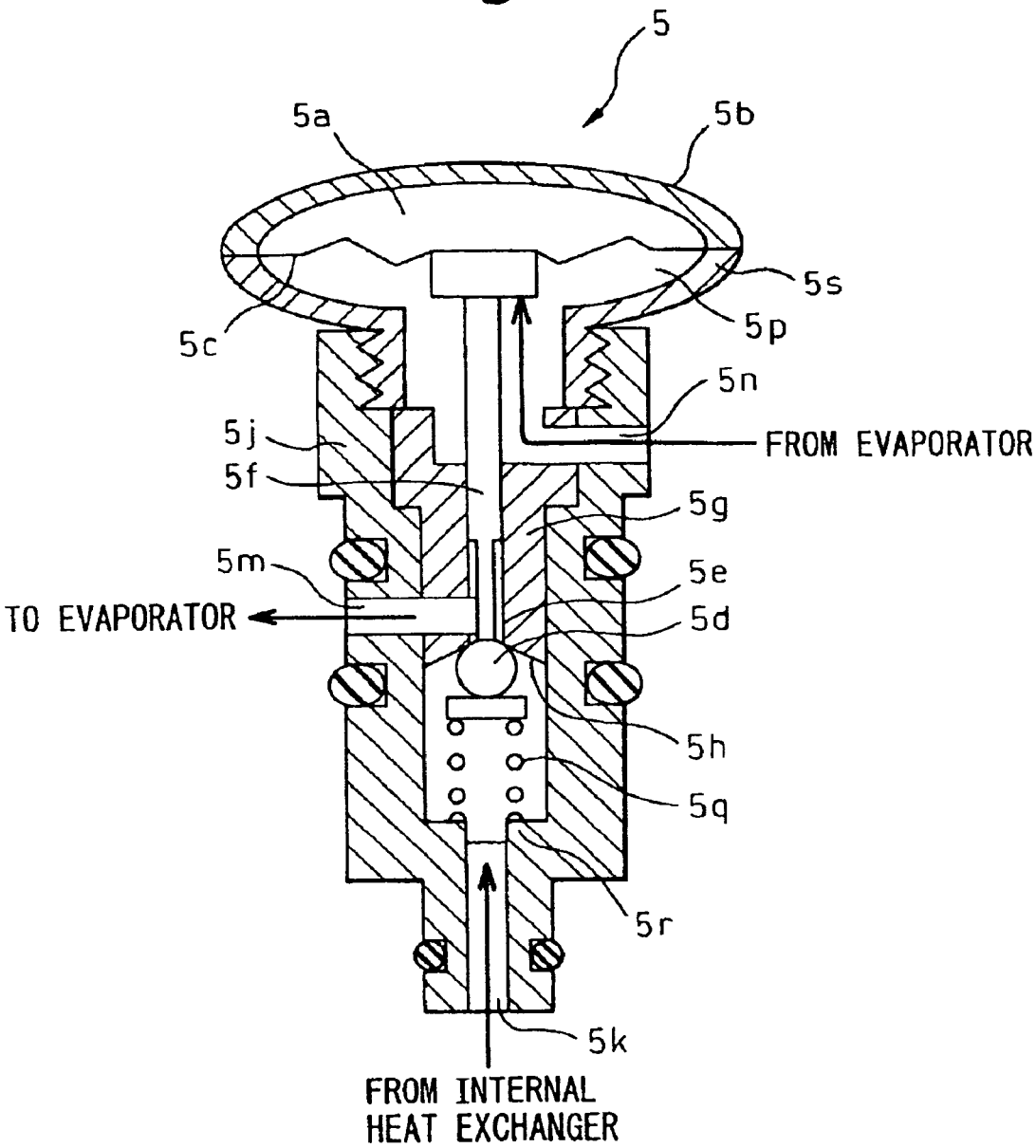
FIG. 4 is a schematic illustration of the expansion valve of the first embodiment of the present invention.

In FIG. 4, the first pressure chamber 5a is an airtightly closed space in which a predetermined mass of gas (refrigerant gas in this embodiment) is enclosed. This first pressure chamber 5a is composed of a first diaphragm case 5b made of rigid material such as metal and a thin film-like diaphragm 5c.

The valve body 5d adjusts the degree of throttle opening of the expansion valve 5, that is, the degree of opening of the valve port 5e. The valve body 5d and the diaphragm 5c are mechanically interlocked with each other and displaced together via the pillar-shaped connecting rod 5f.

The spacer 5g guides a displacement of the connecting rod 5f so that the connecting rod 5f can be reciprocated in the axial direction. In this spacer 5g, the conical tapered valve seat 5h, to stabilize the valve body 5d, is formed. This spacer 5g is inserted into the housing 5j by transition fit or interference fit.

The housing 5j includes: a high pressure refrigerant inlet 5k connected to the internal heat exchanger 7; a decompressed refrigerant outlet 5m connected to the refrigerant inlet side of the evaporator 6; and a low pressure refrigerant introducing port 5n for introducing the pressure of the refrigerant which has flowed out from the evaporator 6.

The pressure introduced from the low pressure refrigerant introducing port 5n is introduced into the second pressure chamber 5p provided on the opposite side of the diaphragm 5c to the side of the diaphragm 5c on which the first pressure chamber 5a is located. Therefore, the pressure introduced from the low pressure refrigerant introducing port 5n acts on the diaphragm 5c from the opposite side to the first pressure chamber 5a.

In this connection, the second pressure chamber 5p is composed of the diaphragm 5c, housing 5j and second diaphragm case 5s. The second diaphragm case 5s is screwed to the housing 5j.

Accordingly, the gas pressure in the first pressure chamber 5a acts on the diaphragm 5c in a direction so that the throttle opening can be increased. On the other hand, the refrigerant pressure in the second pressure chamber 5p acts on the diaphragm 5c in a direction so that the throttle opening can be decreased.

In this connection, as the temperature in the second pressure chamber 5p is substantially the same as the refrigerant temperature on the refrigerant outlet side of the evaporator 6, the temperature in the second pressure chamber 5p is transmitted into the first pressure chamber 5a via the diaphragm 5c and the connecting rod 5f. Therefore, the temperature in the first pressure chamber 5a becomes substantially the same as the refrigerant temperature on the refrigerant outlet side of the evaporator 6. At this time, as a predetermined mass of refrigerant is enclosed into the first pressure chamber 5a and the vapor-phase refrigerant in the first pressure chamber 5a is kept in the saturated state at all times, the inner pressure of the first pressure chamber 5a is the same as the pressure of saturated gas.

The spring 5q is an elastic means for giving an elastic force to the diaphragm 5c via the valve body 5d and the connecting rod 5f, wherein this elastic force acts so that a volume of the first pressure chamber 5a can be reduced from the side of the diaphragm 5c opposite to the side of the diaphragm 5c on which the first pressure chamber 5a is located, that is, from the second pressure chamber 5p side to the first pressure chamber 5a side. The initial load given to this spring 5q is determined by a distance from the load giving portion 5r having a step portion, which comes into contact with the spring 5q on the opposite side to the valve body 5d, to the valve seat 5h.

In this case, according to this present embodiment, as the load giving portion 5r is formed being integrated with the housing 5j into one body, the load giving portion 5r can not be moved with respect to the housing 5j, that is, the load giving portion 5r and the housing 5j are composed into a fixed structure. That is, according to this present embodiment, the pre-load adjusting mechanism for adjusting the initial load is abolished, and the initial load is set at a fixed value by the dimensional relation between the load giving portion 5r and the valve seat 5h.

In this connection, the maximum displacement of the valve body 5d at the time of operation of the vapor-compression-type refrigerating machine is small and, further, the spring constant of the spring 5q is set at a low value. Therefore, the load, which the spring 5q gives to the diaphragm 5c, is substantially the same as the initial load irrespective of the position of the valve body 5d. Therefore, the diaphragm 5c is displaced so that the force, which is generated by the gas pressure in the first pressure chamber 5a, can be balanced with the sum of the force, which is generated by the pressure in the second pressure chamber 5p, and the initial load.

Figure 5:
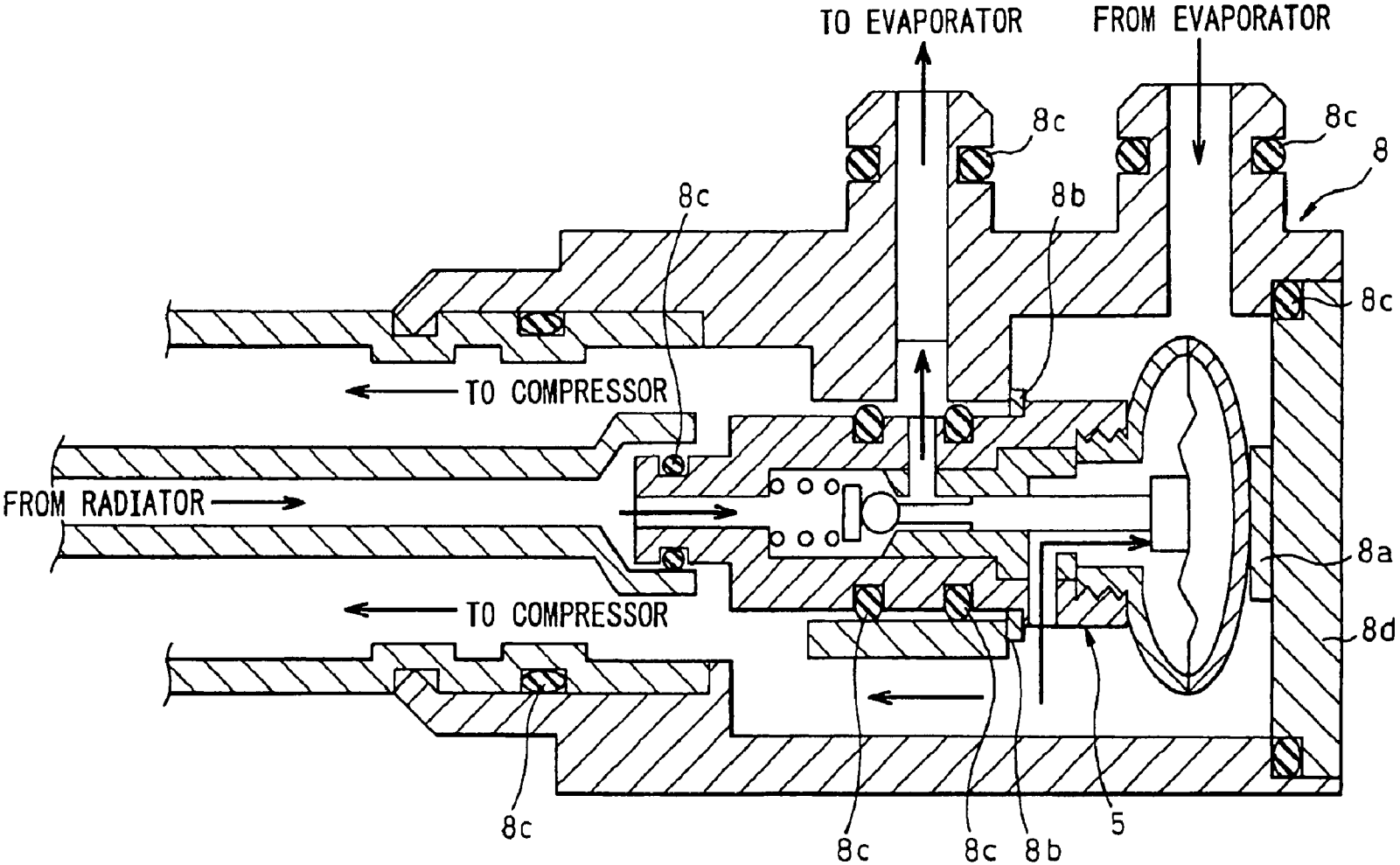
FIG. 5 is a schematic illustration of the expansion valve of the first embodiment of the present invention.

As shown in FIG. 5, the expansion valve 5 is integrated with the internal heat exchanger 7 into one body under the condition that the piping means for making the refrigerant of low pressure flow by connecting the internal heat exchanger 7 with the compressor 1 and the piping means for connecting the expansion valve 5 with the evaporator 6 are accommodated in the integrated casing 8.

In this case, as the expansion valve 5 is fixed in the casing 8 being interposed between the elastic members 8a and 8b made of rubber capable of being elastically deformed, the expansion valve 5 can be elastically deformed in the piping means 7.

In this connection, O-ring 8c is a packing member for maintaining the airtightness of the joining portion, and the lid 8d is a member for closing the opening through which the expansion valve 5 is inserted into the casing 8. In this embodiment, parts of the expansion valve 5, the casing 8 and the internal heat exchanger 7 are made of metal, and the casing 8 and the internal heat exchanger 7 are combined with each other by means of calking, and the lid 8d is fixed to the casing 8 by screws.

Next, the operation and effect of this embodiment will be described below.

A quantity of latent heat of evaporation is much larger than a quantity of sensible heat (specific heat of refrigerant in the vapor phase). Therefore, in order to effectively increase the refrigerating capacity of the vapor-compression-type refrigerating machine, that is, in order to effectively increase the quantity of heat absorbed by the evaporator 6, it is necessary to evaporate the refrigerant in the liquid phase in all regions from the refrigerant inlet to the refrigerant outlet of the evaporator 6.

When the refrigerant of the liquid phase, the quantity of which is larger than the quantity of the refrigerant corresponding to the heat to be absorbed by the evaporator 6, is supplied to the evaporator 6, the refrigerant of the liquid phase can be evaporated in all regions from the refrigerant inlet to the refrigerant outlet of the evaporator 6. Accordingly, the quantity of heat to be absorbed by the evaporator 6 can be positively ensured. However, there is a high possibility that the refrigerant of the liquid phase is sucked into the compressor 1. When the refrigerant in the liquid phase is sucked into the compressor 1, the refrigerant is excessively compressed, and the discharging pressure of the compressor 1 is abnormally raised, which causes damage in the compressor 1 and the radiator 2.

However, the pressure of gas in the first pressure chamber 5a is the saturated gas pressure, and the diaphragm 5c is displaced so that the force, which is generated by the gas pressure in the first pressure chamber 5a, can be balanced with the sum of the force, which is generated by the pressure in the second pressure chamber 5p, and the initial load. Therefore, the degree of throttle opening of the expansion valve 5 is controlled so that the degree of superheat of the refrigerant at the inlet 5n for introducing the refrigerant of low pressure can be a value corresponding to the initial load. Accordingly, from the ideal viewpoint, there is no possibility that the refrigerant of the liquid phase is sucked into the compressor 1.

Accordingly, as described in the Related Art section, an operation is conventionally conducted as follows. In order to absorb a difference between the individual bodies of the expansion valves 5, which is caused by the dimensional fluctuation, after all parts have been assembled, the pre-load adjusting mechanism is adjusted, so that the initial load can be adjusted and the valve body 5d can be appropriately operated.

On the other hand, in this embodiment, as the internal heat exchanger 7 is provided, the refrigerant flowing into the expansion valve 5 is cooled by this internal heat exchanger 7, and enthalpy of the refrigerant flowing into the evaporator 6 is decreased. Therefore, the refrigerant sucked into the compressor 1 is heated, on the contrary.

Accordingly, the heat absorbing capacity of the evaporator 6 can be enhanced by making a difference in enthalpy between the refrigerant inlet and the refrigerant outlet of the evaporator 6 large, and it becomes possible to give a degree of superheat to the refrigerant sucked into the compressor 1. Accordingly, even if the pre-load adjusting mechanism is abolished, the vapor compression type refrigerating machine can be stably operated.

Figure 6:
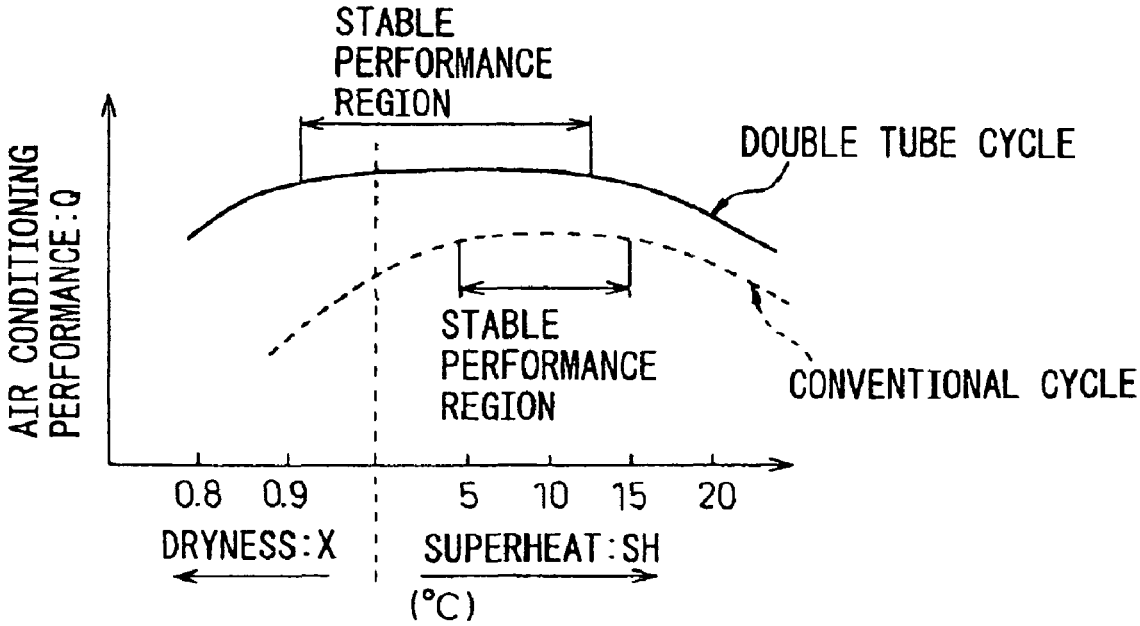
FIG. 6 is a graph showing a relation between the refrigerating capacity and the degree of superheat.

As shown in FIG. 6, it is conventional that the pre-load adjusting mechanism is adjusted so that the degree of superheat can be in a predetermined range at the refrigerant outlet of the evaporator 6. However, according to the present invention, as the vapor-compression-type refrigerating machine is provided with the internal heat exchanger 7, for example, even if the refrigerant of the liquid phase exists at the refrigerant outlet of the evaporator 6, it is possible to give the degree of superheat to the refrigerant which is sucked into the compressor 1. Therefore, the vapor-compression-type refrigerating machine can be stably operated in a wide operational range.

As the expansion valve 5 is accommodated in the casing 8 which composes a piping means, noise caused by the vibration of the expansion valve 5 can be reduced while the expansion valve 5 is being protected from heat transmitted from the engine for running. Accordingly, while the occurrence of malfunction of the expansion valve 5 caused by the heat transmitted from the engine is being previously prevented, the degree of freedom of arranging the expansion valve 5 can be extended.

As the internal heat exchanger 7 and the expansion valve 5 are integrated with each other into one body, it is possible to reduce the number of pipes and further it is possible to reduce the number of processes for assembling the vapor-compression-type refrigerating machine to a vehicle. Furthermore, it is possible to mount the vapor-compression-type refrigerating machine in a small space.

As the expansion valve 5 is fixed in the casing 8 in such a manner that the expansion valve 5 can be elastically displaced, the vibration of the expansion valve 5 generated in the process of decompression can be absorbed. Therefore, the occurrence of noise caused by the vibration of the expansion valve 5 can be reduced.

(Second Embodiment)

Figure 7:
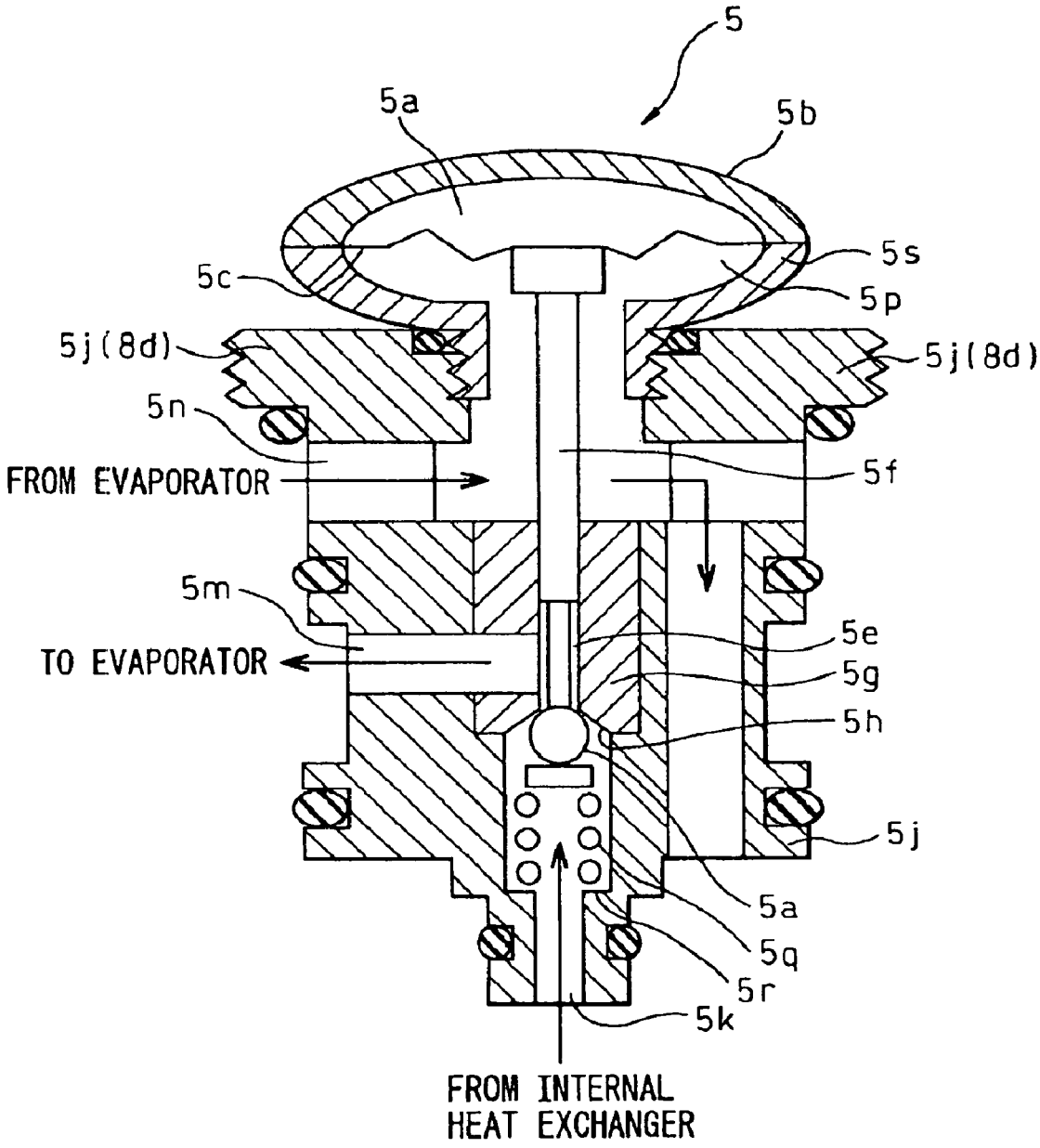
FIG. 7 is a schematic illustration of an expansion valve of a second embodiment of the present invention.
Figure 8:
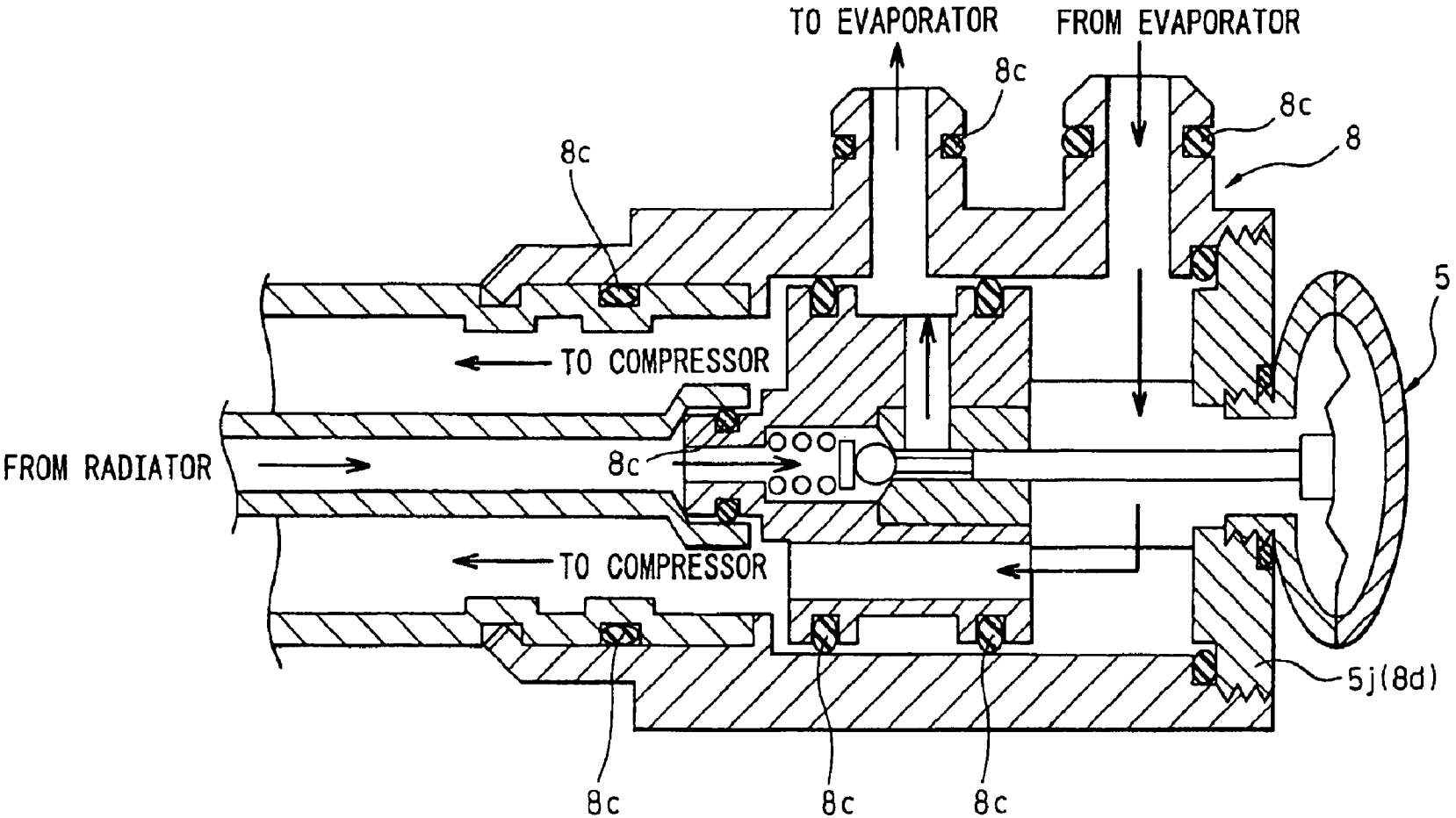
FIG. 8 is a schematic illustration of the expansion valve of the second embodiment of the present invention.

In the first embodiment, the entire expansion valve 5 is accommodated in the casing 8. However, according to the second embodiment, as shown in FIGS. 7 and 8, when the lid 8d is arranged in the expansion valve 5, the lid 8d of the casing 8 is abolished, so that the number of processes for assembling can be reduced and further the number of parts can be reduced.

In this connection, in this embodiment, under the condition that the valve port 5e of the expansion valve 5, that is, the throttling portion is accommodated in the casing 8, the expansion valve 5 is fixed in the casing 8 capable of being elastically displaced. Therefore, vibration of the expansion valve 5 generated in the process of decompression can be absorbed, and the occurrence of noise caused by the vibration of the expansion valve 5 can be reduced.

(Third Embodiment)

Figure 9:
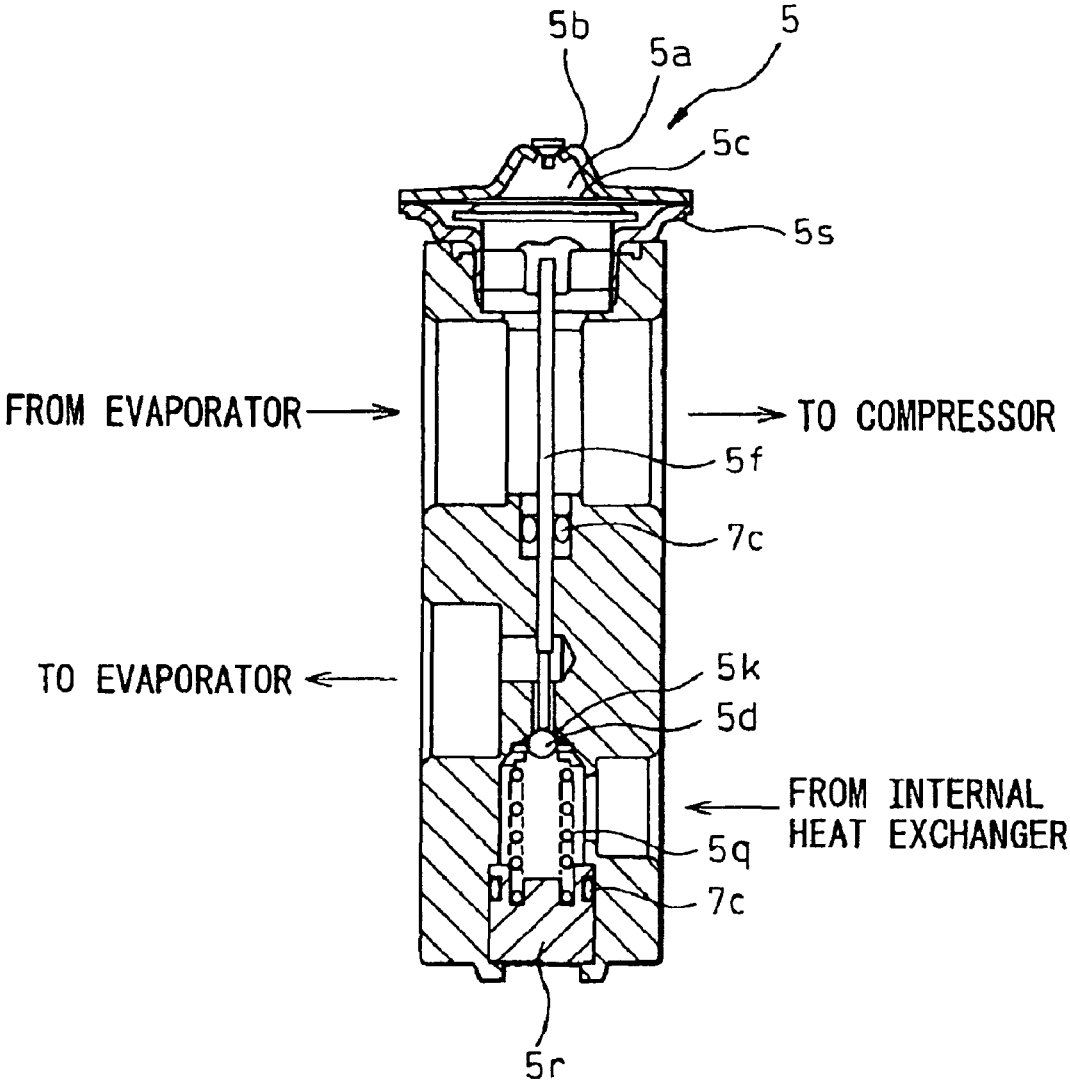
FIG. 9 is a schematic illustration of an expansion valve of a third embodiment of the present invention.

In the first and the second embodiment, the expansion valve 5 is accommodated in the casing 8. However, according to the this embodiment, as shown in FIG. 9, the expansion valve 5 is composed of a single body.

In this connection, in the first and the second embodiment, the load giving portion 5r is formed being integrated with the housing 5j into one body. However, in this embodiment, the load giving portion 5r is formed being separate from the housing 5j, and the load giving portion 5r is fixed to the housing 5j by means of calking so that the load giving portion 5r can not be moved with respect to the housing 5j.

In this connection, in the first and the second embodiment, in the case where the control characteristic of the expansion valve 5 is changed in the first and the second embodiment, it is necessary that at least one of the spacer 5g and the housing 5j is changed so as to change a dimensional relation between the load giving portion 5r and the valve seat 5h. However, according to this embodiment, when the thickness of the load giving portion 5r is changed, the dimensional relation between the load giving portion 5r and the valve seat 5h can be changed. Therefore, parts except for the load giving portion 5r can be used in common.

(Fourth Embodiment)

Figure 10:
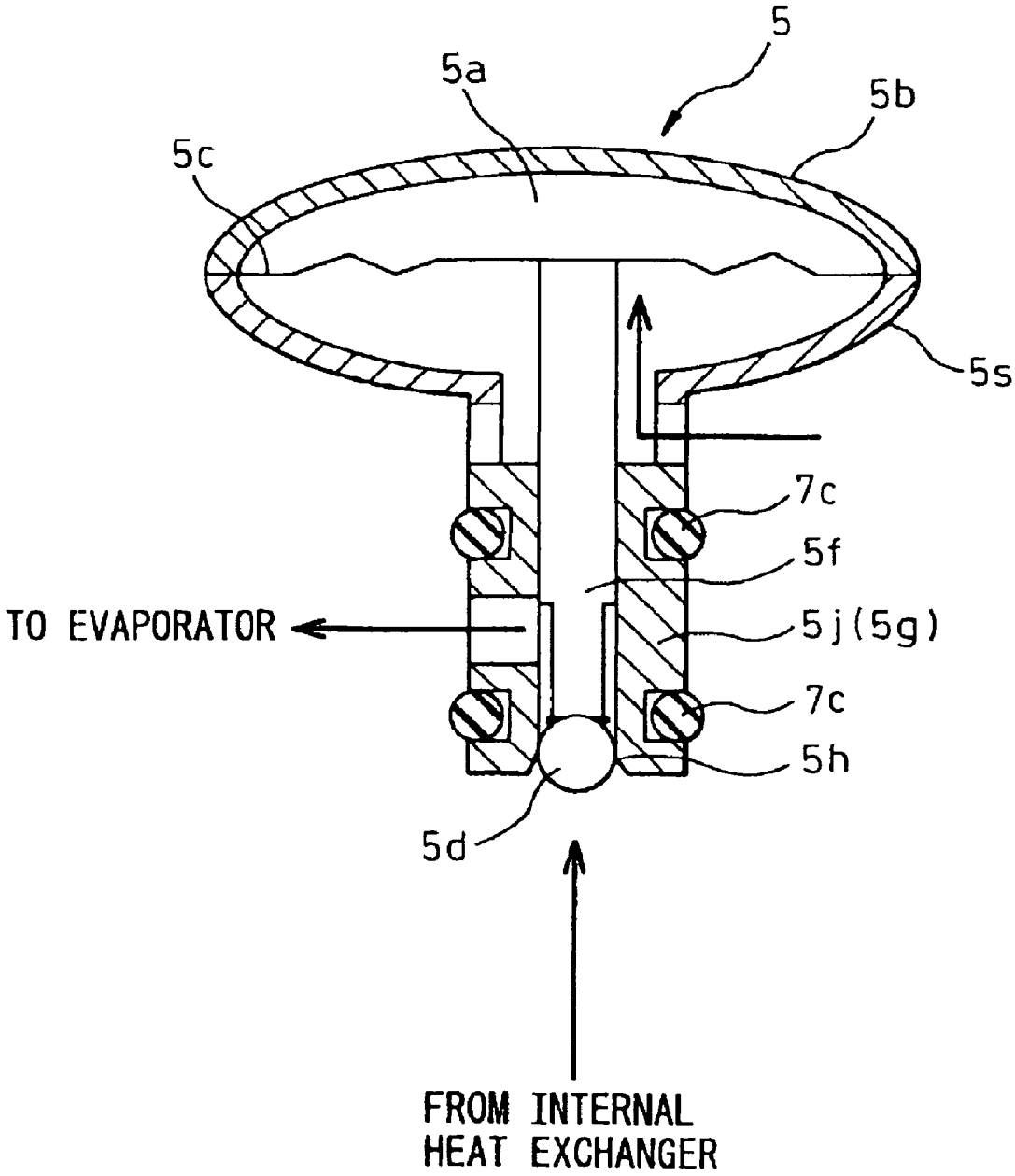
FIG. 10 is a schematic illustration of an expansion valve of a fourth embodiment of the present invention.
Figure 11:
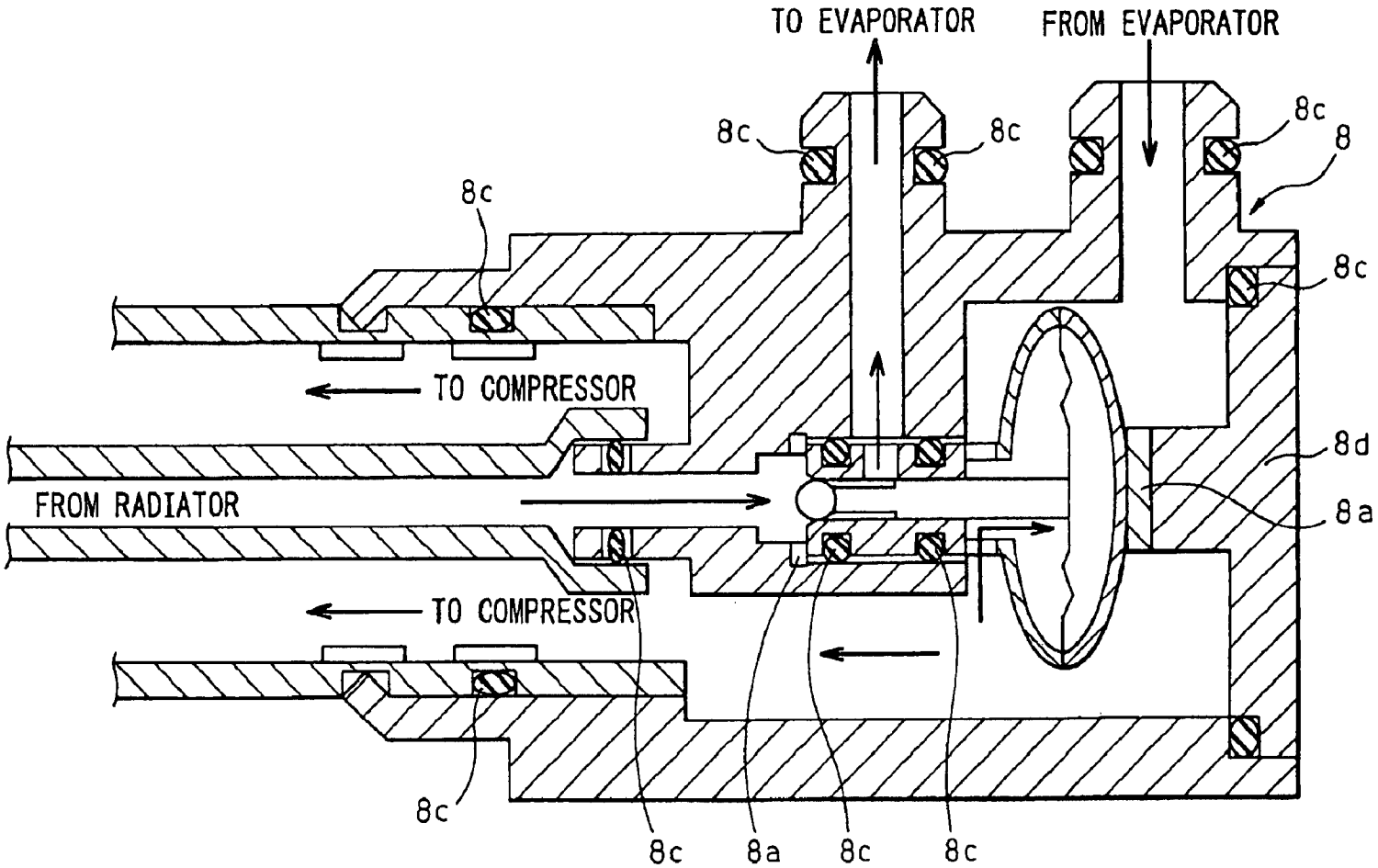
FIG. 11 is a schematic illustration of an expansion valve of a fourth embodiment of the present invention.

In the first to the third embodiment, the expansion valve 5 includes a spring 5q to give the initial load. However, according to this embodiment, as shown in FIGS. 10 and 11, the spring 5q is abolished, and the diaphragm 5c is displaced only by the pressure difference Δp between the pressure of gas in the first pressure chamber 5a and the pressure in the second pressure chamber 5p.

In this connection, in the present embodiment, the diaphragm 5c and the connecting rod 5f are connected with each other by means of welding or soldering, and the connecting rod 5f and the valve body 5d are connected with each other by means of welding or soldering. Further, the second diaphragm case 5s is integrated with the housing 5j into one body.

In this connection, in the present embodiment, after the connecting rod 5f and the valve body 5d have been joined to each other, the connecting rod 5f is inserted into the housing 5j, and the diaphragm 5c and the connecting rod 5f are joined to each other.

Next, the operation and effect of this embodiment will be described below.

Figure 12:
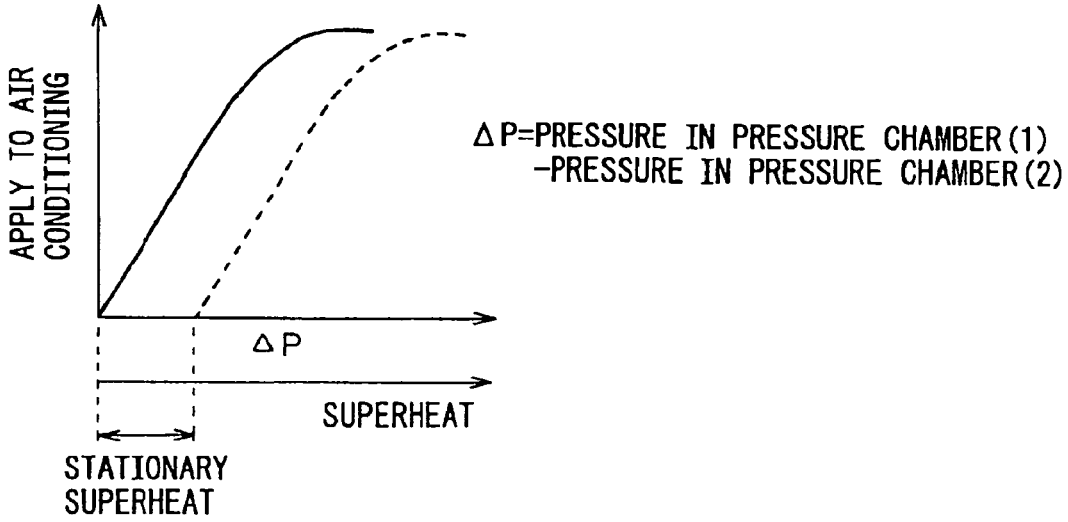
FIG. 12 is a graph showing a relation between the flow rate and the degree of superheat.

As the pressure of gas in the first pressure chamber 5a is the saturated gas pressure and the diaphragm 5c is displaced so that the force, which is generated by the gas pressure in the first pressure chamber 5a, can be balanced with the force which is generated by the pressure in the second pressure chamber 5p, the degree of throttle opening of the expansion valve 5 is controlled so that the pressure of the refrigerant at the introducing port 5n of introducing the refrigerant of low pressure can be the saturated gas pressure as shown by the solid line in FIG. 12, that is, the degree of throttle opening of the expansion valve 5 is controlled so that the degree of superheat can be 0 in the state in which the compressor 1 is stopped.

On the other hand, in this embodiment, as the internal heat exchanger 7 is provided, the refrigerant flowing into the expansion valve 5 is cooled by this internal heat exchanger 7, and enthalpy of the refrigerant flowing into the evaporator 6 is decreased. Therefore, the refrigerant sucked into the compressor 1 is heated, on the contrary.

Accordingly, the heat absorbing capacity of the evaporator 6 can be enhanced by making a difference in enthalpy between the refrigerant inlet and the refrigerant outlet of the evaporator 6 large, and it becomes possible to give the degree of superheat to the refrigerant sucked into the compressor 1. Accordingly, even if the pre-load adjusting mechanism is abolished, the vapor-compression-type refrigerating machine can be stably operated.

As the diaphragm 5c and the connecting rod 5f are joined to each other and the connecting rod 5f and the valve body 5d are also joined to each other, it is possible to displace the valve body 5d being completely interlocked with the displacement of the diaphragm 5c. Accordingly, the expansion valve 5 can respond quickly.

In this connection, in the first embodiment, as the valve body 5d is pressed down by the spring 5q, when a deformation speed of the spring 5q is lower than a displacement speed of the diaphragm 5c, there is a possibility that the valve body 5d can not be completely interlocked with the displacement of the diaphragm 5c.

As the second diaphragm case 5s is formed being integrated with the housing 5j into one body, the dimensional accuracy among the diaphragm 5c, valve body 5d and valve seat 5h can be enhanced.

In the above embodiment, the present invention is applied to the air-conditioner for vehicle use. However, it should be noted that the present invention is not limited to the above specific embodiment.

The structure of the internal heat exchanger 7 is not limited to the specific structure shown in the above embodiment.

While the invention has been described by reference to specific embodiments chosen for purposes of illustration, it should be apparent that numerous modifications could be made thereto, by those skilled in the art, without departing from the basic concept and scope of the invention.

What is claimed is:

1. A vapor-compression-type refrigerating machine for moving heat from a portion on the low temperature side to a portion on the high temperature side, comprising:

a compressor for sucking and compressing refrigerant;

a radiator for radiating heat from the refrigerant of high pressure;

an expansion valve for decompressing and expanding the refrigerant cooled by the radiator;

an evaporator for evaporating the refrigerant decompressed by the expansion valve so that heat can be absorbed by the refrigerant; and an internal heat exchanger for exchanging heat between the refrigerant of high pressure before the decompression by the expansion valve and the refrigerant of low pressure to be sucked by the compressor, the expansion valve including:

a thin film-like diaphragm forming an airtightly closed space into which a predetermined mass of gas is enclosed;

a valve body for changing a degree of throttle opening being interlocked with a displacement of the diaphragm;

a spring for giving an elastic force to the valve body in a direction so that a volume of the airtightly closed space can be reduced, from an opposite side of the diaphragm to the side of the diaphragm on which the airtightly closed space is located; and a load giving portion for giving an initial load to the spring, wherein pressure in the airtightly closed space changes according to the temperature of the refrigerant flowing out from the evaporator, pressure of the refrigerant flowing out from the evaporator acts on an opposite side of the diaphragm to the side of the diaphragm on which the airtightly closed space is located, and the load giving portion can not be moved with respect to the housing.

2. A vapor-compression-type refrigerating machine according to claim 1, wherein the internal heat exchanger is a double tube composed of an inner cylindrical tube and outer cylindrical tube.

3. A vapor-compression-type refrigerating machine according to claim 1, wherein the expansion valve is accommodated in a piping means composing a refrigerant passage in which the refrigerant at low pressure flows.

4. A vapor-compression-type refrigerating machine according to claim 3, wherein the expansion valve is fixed so that it can be elastically displaced in the piping means.

5. A vapor-compression-type refrigerating machine according to claim 1, wherein the internal heat exchanger and the expansion valve are integrated with each other into one body.

6. A vapor-compression-type refrigerating machine for moving heat from a portion on the low temperature side to a portion on the high temperature side, comprising:

a compressor for sucking and compressing refrigerant;

a radiator for radiating heat from the refrigerant of high pressure;

an expansion valve for decompressing and expanding the refrigerant cooled by the radiator;

an evaporator for evaporating the refrigerant decompressed by the expansion valve so that heat can be absorbed by the refrigerant; and an internal heat exchanger for exchanging heat between the refrigerant of high pressure before the decompression by the expansion valve and the refrigerant of low pressure to be sucked by the compressor, the expansion valve including:

a thin film-like diaphragm forming an airtightly closed space into which a predetermined mass of gas is enclosed; and a valve body for changing a degree of throttle opening being interlocked with a displacement of the diaphragm, wherein pressure in the airtightly closed space changes according to the temperature of the refrigerant flowing out from the evaporator, pressure of the refrigerant flowing out from the evaporator acts on an opposite side of the diaphragm to the side of the diaphragm on which the airtightly closed space is located, and the diaphragm is displaced only by a difference in pressure between the airtightly closed space and the refrigerant flowing out from the evaporator.

7. A vapor-compression-type refrigerating machine according to claim 6, wherein the connecting rod for connecting the diaphragm with the valve body is joined to the diaphragm and, further;

the connecting rod is joined to the valve body.

8. A vapor-compression-type refrigerating machine according to claim 6, wherein a diaphragm case for supporting the diaphragm from the opposite side to the side, on which the airtightly closed space is located, is integrated with the housing, in which the valve seat is formed, by means of integral forming or joining.

9. A vapor-compression-type refrigerating machine according to claim 6, wherein the internal heat exchanger is a double tube composed of an inner cylindrical tube and outer cylindrical tube.

10. A vapor-compression-type refrigerating machine according to claim 6, wherein the expansion valve is accommodated in a piping means composing a refrigerant passage in which the refrigerant at low pressure flows.

11. A vapor-compression-type refrigerating machine according to claim 10, wherein the expansion valve is fixed so that it can be elastically displaced in the piping means.

12. A vapor-compression-type refrigerating machine according to claim 6, wherein the internal heat exchanger and the expansion valve are integrated, with each other, into one body.

*13. The vapor-compression-type refrigerating machine according to claim 1, wherein the expansion valve regulates an amount of refrigerant supplied to the evaporator to adjust a state of refrigerant flowing between the evaporator and the internal heat exchanger within a range between a dryness X=0.9 and a superheat SH=5° C.*

*14. The vapor-compression-type refrigerating machine according to claim 13, wherein the state of refrigerant is adjusted within a range between a dryness X=0.9 and a superheat SH=0° C.*

*15. The vapor-compression-type refrigerating machine according to claim 13, wherein the state of refrigerant is adjusted within a range between a superheat SH=0° C. and a superheat SH=5° C.*

*16. The vapor-compression-type refrigerating machine according to claim 6, wherein the expansion valve regulates an amount of refrigerant supplied to the evaporator to adjust a state of refrigerant flowing between the evaporator and the internal heat exchanger within a range between a dryness X=0.9 and a superheat SH=5° C.*

*17. The vapor-compression-type refrigerating machine according to claim 16, wherein the state of refrigerant is adjusted within a range between a dryness X=0.9 and a superheat S=0° C.*

*18. The vapor-compression-type refrigerating machine according to claim 16, wherein the state of refrigerant is adjusted within a range between a superheat SH=0° C. and a superheat SH=5° C.*

*19. A vapor-compression-type refrigerating machine for moving heat from a portion on a low temperature side to a portion on a high temperature side, comprising:*

*a compressor for sucking and compressing refrigerant;*

*a radiator for radiating heat from the refrigerant of high pressure;*

*an expansion device disposed between a high pressure side and a low pressure side of the vapor-compression-type refrigerating machine, the expansion device having a passage in which the refrigerant cooled by the radiator flows;*

*an evaporator for evaporating the refrigerant decompressed by the expansion device so that heat can be absorbed by the refrigerant; and*

*an internal heat exchanger disposed between a high pressure passage to the expansion device and a low pressure passage from the evaporator to provide heat exchange between the refrigerant of high pressure before the decompression by the expansion device and the refrigerant of low pressure to be sucked by the compressor, wherein*

*the expansion device regulates an amount of refrigerant supplied to the evaporator to adjust a state of refrigerant flowing between the evaporator and the internal heat exchanger within a range between a dryness X=0.9 and a superheat SH=5° C.;*

*the expansion valve comprises a throttle portion having a variable opening; and*

*the variable opening of the throttle portion is variable based on a differential pressure between a pressure of gas in an airtightly closed space, the volume of the closed space being variable based on a temperature of*

*the refrigerant flowing from the evaporator to the internal heat exchanger and a pressure of the refrigerant flowing from the evaporator to the internal heat exchanger.*

*20. The vapor-compression-type refrigerating machine according to claim 19, wherein the state of refrigerant is adjusted within a range between a dryness X=0.9 and a superheat SH=0° C.*

*21. The vapor-compression-type refrigerating machine according to claim 19, wherein the state of refrigerant is adjusted within a range between a superheat SH=0.0 and a superheat SH=5° C.*

*22. The vapor-compression-type refrigerating machine according to claim 19, wherein the internal heat exchanger is a double tube including an inner tube and an outer tube.*

*23. The vapor-compression-type refrigerating machine according to claim 19, wherein the expansion device is accommodated in a piping providing a refrigerant passage in which the refrigerant at low pressure flows.*

*24. The vapor-compression-type refrigerating machine according to claim 23, wherein the expansion device is fixed so that it can be elastically displaced in the piping.*

*25. The vapor-compression-type refrigerating machine according to claim 19, wherein the internal heat exchanger and the expansion device are integrated with each other into one body.*

*26. An expansion device for a vapor-compression-type refrigerating cycle, the expansion device comprising:*

*a throttle portion of which an opening is variable, the throttle portion receiving refrigerant from an internal heat exchanger disposed between a high pressure passage to the expansion device and a low pressure passage from an evaporator to provide heat exchange therebetween; and*

*a temperature detecting portion defining a chamber of which volume varies in response to a temperature indicative of a state of refrigerant and actuates the throttle portion, wherein*

*the throttle portion and the temperature detecting portion are adjusted to regulate amount of refrigerant to adjust the state of refrigerant flowing between the evaporator and the internal heat exchanger within a range between a dryness X=0.9 and a superheat SH=5° C.; and*

*the variable opening of the throttle portion is variable based on a differential pressure between a pressure of gas in the chamber, the volume of the chamber based on a temperature of the refrigerant flowing from the evaporator to the internal heat exchanger and a pressure of the refrigerant flowing from the evaporator to the internal heat exchanger.*

*27. The expansion device according to claim 26, wherein the throttle portion and the temperature detecting portion are adjusted to adjust the state of refrigerant within a range between a dryness X=0.9 and a superheat SH=0° C.*

*28. The expansion device according to claim 26, wherein the throttle portion and the temperature detecting portion are adjusted to adjust the state of refrigerant within a range between a superheat SH=0° C. and a superheat SH=5° C.*

*29. The expansion device according to claim 26, further comprising a housing enabling direct connection with the internal heat exchanger.*

* * * * *